United States Patent
Bauseler

(10) Patent No.: US 6,684,729 B2
(45) Date of Patent: Feb. 3, 2004

(54) TOOTHED GEAR

(75) Inventor: Siegbert Bauseler, Kirchhundem (DE)

(73) Assignee: H. B. Seissenschmidt AG, Plettenberg (DE)

( * ) Notice: Subject to any disclaimer, the term of this patent is extended or adjusted under 35 U.S.C. 154(b) by 0 days.

(21) Appl. No.: 09/935,826

(22) Filed: Aug. 23, 2001

(65) Prior Publication Data

US 2002/0029649 A1 Mar. 14, 2002

(30) Foreign Application Priority Data

Aug. 24, 2000 (DE) .......................... 100 41 696

(51) Int. Cl.⁷ .............................................. F16H 55/22
(52) U.S. Cl. ............................ 74/460; 74/410; 74/411; 74/421 R
(58) Field of Search ..................... 74/410, 411, 421 R, 74/446, 448, 459.5, 460

(56) References Cited

U.S. PATENT DOCUMENTS

| | | | | |
|---|---|---|---|---|
| 342,314 A | * | 5/1886 | Averling | 74/410 |
| 826,129 A | * | 7/1906 | Troup | 74/410 |
| 2,493,106 A | * | 1/1950 | Burton | 74/448 |
| 2,707,884 A | * | 5/1955 | Boisvert | 74/448 |
| 3,226,996 A | * | 1/1966 | Breuer | 74/421 R |
| 3,371,549 A | | 3/1968 | Schrempp | |
| 4,070,920 A | * | 1/1978 | LeBlanc | 74/446 |
| 4,118,848 A | * | 10/1978 | Goldschmidt et al. | 29/159 |
| 4,437,356 A | * | 3/1984 | Imazaike | 74/411 |
| 4,541,296 A | * | 9/1985 | Oyafuso | 74/459.5 |
| 5,307,705 A | * | 5/1994 | Fenelon | 74/411 |
| 5,452,622 A | * | 9/1995 | Fenelon | 74/411 |
| 5,707,114 A | * | 1/1998 | Schlanger | 301/58 |
| 5,911,788 A | * | 6/1999 | Russ et al. | 74/411 |

FOREIGN PATENT DOCUMENTS

| | | |
|---|---|---|
| DE | 908 317 | 4/1954 |
| JP | 61188498 | * 2/1988 |

* cited by examiner

Primary Examiner—David A. Bucci
Assistant Examiner—Colby Hansen
(74) Attorney, Agent, or Firm—Collard & Roe, P.C.

(57) ABSTRACT

A toothed gear includes an outer toothed rim 1, a hub 3 and a profiled bridge area 2 connecting the toothed rim 1 and the hub 3 as one piece. The bridge area 2 is connected to the toothed rim and the hub in different planes. The bridge area consists of uniformly spaced, spoke-like bridges 2, which are uniformly distributed over the circumference. The bridges are arranged in an alternating manner on both sides of a center plane extending through the toothed gear.

3 Claims, 3 Drawing Sheets

US 6,684,729 B2

TOOTHED GEAR

CROSS REFERENCE TO RELATED APPLICATIONS

Applicant claims priority under 35 U.S.C. §119 of German Application No. 100 41 696.9-12 filed Aug. 24, 2000.

BACKGROUND OF THE INVENTION

1. Field of the Invention

The present invention relates to a toothed gear including an outer toothed rim, a hub and a profiled bridge area connecting the toothed rim and the hub as one piece, the bridge area being connected to the toothed rim and to the hub in different planes.

2. The Prior Art

Blanks for such toothed gears are known from DE-PS 908 317. Such blanks are one-piece gear wheels that can be manufactured by pressing or forging methods. The outer toothed rim and the hub of such gear wheels are connected to each other by a completely closed, disk-like bridge area. The disk-shaped bridge area preferably consists of alternately arched, circular sectors which, on account of their shape, are tied to the toothed rim and to the hub in different planes. The disk-like bridge area is required in connection with such toothed gears in order to satisfy strength requirements and to avoid vibration phenomena that may lead to the development of noise. Such a disk-shaped bridge area requires relatively high material expenditure.

Toothed wheels with bridge areas in the form of spokes are known from U.S. Pat. No. 3,371,549, where the spoke-like elements are always tied in the center both to the inner side of the toothed rim and to the hub. Such spoke-like bridge areas may be profiled as well. The blanks for toothed gears of this type manufactured by forging or pressing methods are hardened by thermal treatments. Such heat treatments cause substantial phenomena of distortion between the toothed rim and the hub that have to be attributed to the special shapes of the bridge areas.

The problem of the invention is to optimize the area of the bridge area of a toothed wheel that is to be producible by pressing or forging methods with respect to its distortion behavior in heat hardening processes and in regard to required weight reductions.

SUMMARY OF THE INVENTION

The problem is solved in accordance with the invention with a toothed gear including an outer toothed rib, a hub and a profiled bridge area connecting the toothed rim and the hub as one piece. The bridge area is connected to the toothed rim and to the hub in different planes. Moreover, the bridge area is formed by uniformly spaced, bridge spokes uniformly distributed over the circumference. The bridges are arranged in an alternating manner on both sides of a center plane. Owing to the arrangement of the spoke-like bridges, distortion phenomena are avoided to a large extent in heat treating the blanks for the toothed gears. Shaping the bridge area in the form of individual spokes leads to substantial material savings combined with adequate strength values.

In a preferred embodiment, each spoke is a section of an imaginary disk connecting the toothed rim and the hub, the disk being profiled in the peripheral direction as a periodic circular function. Such toothed gears can be shaped with Particularly good results, and they exhibit good strength properties and vibration damping properties particularly if each bridge is formed in the area of maximum amplitude of the circular function.

It was found that it is favorable to arrange the bridges in an alternating manner in two planes extending parallel with the center plane and to space the bridges from the center plane.

The strength properties are increased by an embodiment of the toothed gears where the bridges have widened transition areas directly connecting the bridges to both the hub and to the inner side of the tooth rim.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
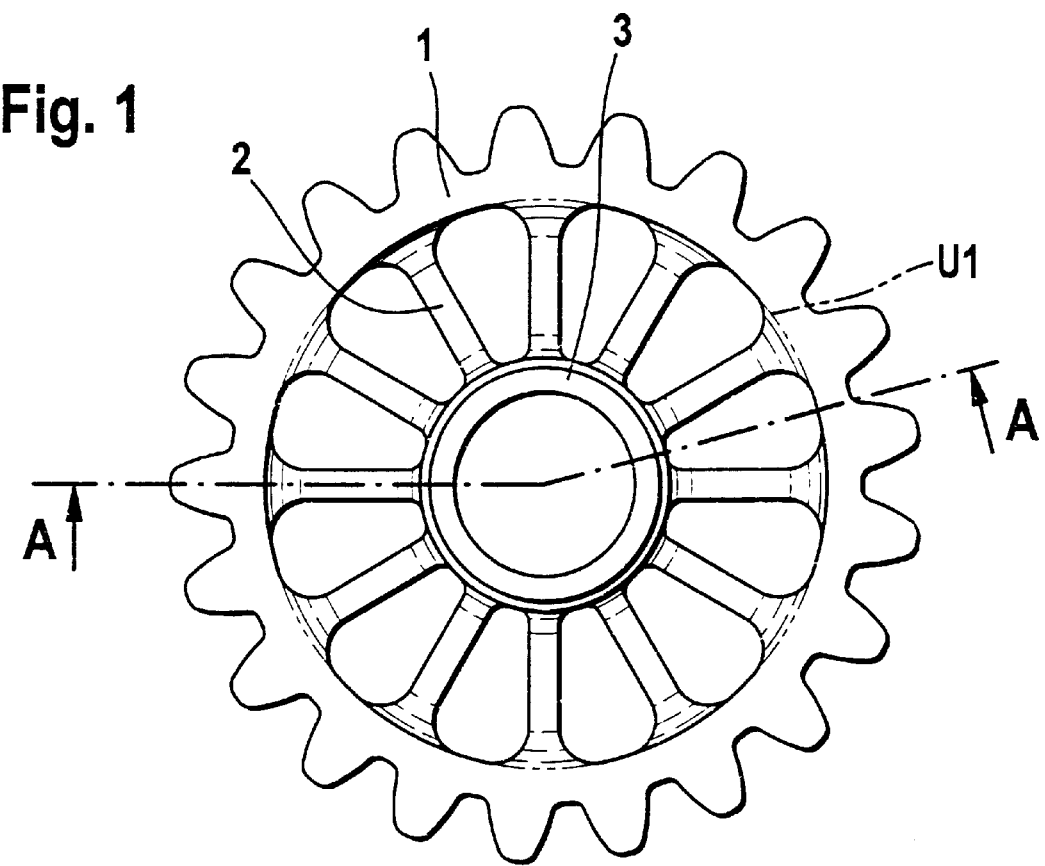
FIG. 1 shows a side view of a toothed gear in accordance with the present invention.
Figure 2:
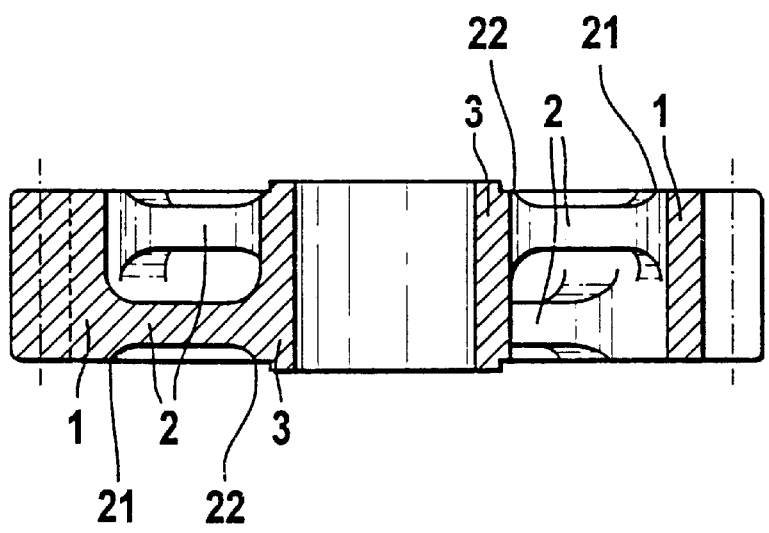
FIG. 2 shows a sectional view taken along line A—A in FIG. 1.
Figure 3:
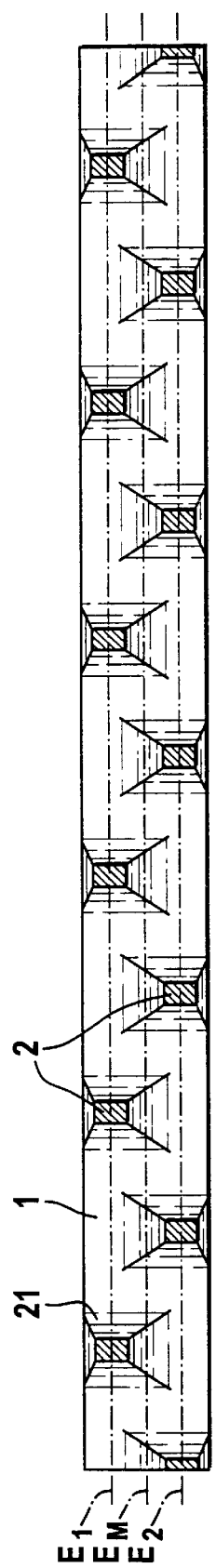
FIG. 3 shows a sectional view showing the angling of a circular section taken along section line $U_1$, in FIG. 1.
Figure 4:
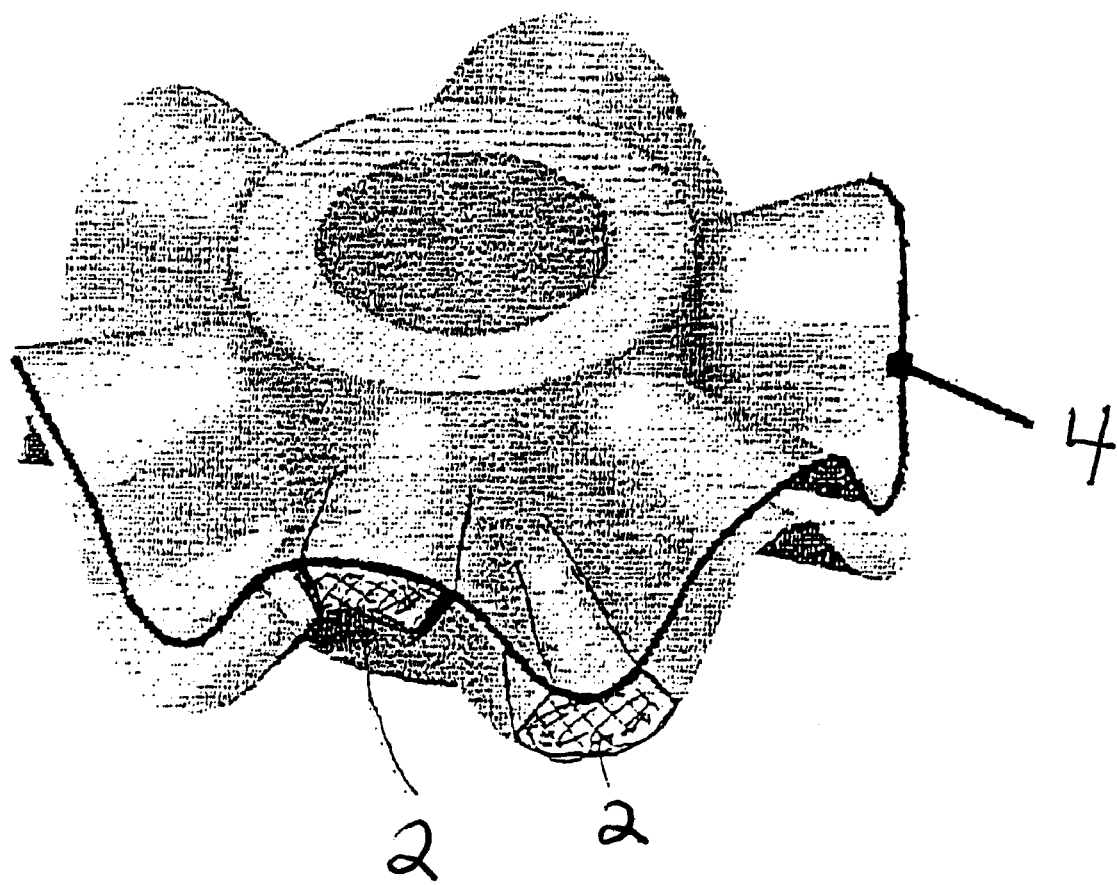
FIG. 4 shows a perspective view of imaginary disk profiled in the peripheral direction as a circular function.

Referring to FIG. 1, a toothed gear is shown which includes a hub 3, an outer toothed rim 1 and a plurality of spoke-like bridges interconnecting hub 3 and rim 1 as a single piece. As is particularly shown in FIGS. 2 and 3, the bridges or spokes are alternately arranged with a uniform peripheral distribution in the planes $E_1$ and, respectively, $E_2$, shown in FIG. 3 extending parallel with and spaced on either side from the center plane $E_M$ passing through rim 1. Bridges 2 are formed as a section of an imaginary disk connecting toothed rim 1 on the inside and hub 3 on the outside, the disk being profiled in the peripheral direction as a periodic circular function 4. Each bridge 2 is formed in the areas of maximum amplitude of the circular function.

Bridges 2 are connected to both the inner side of outer toothed rim 1 and to the outer side of hub 3 with widened transition areas 21 and 22, respectively.

While only one embodiment of the present invention has been shown and described, it is to be understood that many changes and modifications may be made thereunto without departing from the spirit and scope of the invention as defined in the appended claims.

What is claimed is:

1. A toothed gear comprising:

(a) a hub having a circumference;

(b) a profiled bridge area connected to said hub in first and second parallel planes; and (c) an outer toothed rim connected to said bridge area in said first and second parallel planes;

wherein said hub, said bridge area, and said rim form an integral unit and said bridge area comprises a plurality of uniformly spaced, radially extending spokes along the circumference of said hub arranged in an alternating manner on each of said first and second parallel planes passing through said rim, each spoke forming a section of an imaginary disk connecting said toothed rim and said hub, wherein the imaginary disk is profiled in a circumferential direction as a circular function, each spoke being formed in the region of the amplitude of the circular function, and each spoke having a widened transition area on each end of said spoke directly connected to a respective one of said hub and an inner side of said rim.

2. The toothed gear according to claim 1 wherein the spokes are arranged in an alternating manner in two planes extending parallel with the center plane.

3. The toothed gear according to claim 2 wherein the bridges are spaced from the center plane.

* * * * *